US012786759B2

(12) United States Patent
Gross et al.

(10) Patent No.: US 12,786,759 B2
(45) Date of Patent: Nov. 3, 2026

(54) INTEGRATED AND COMPACT SMART TRANSMISSION AND RECEPTION SYSTEM

(71) Applicant: MVG Industries, Villejust (FR)

(72) Inventors: Nicolas Gross, Villejust (FR); Shoaib Anwar, Villejust (FR)

(73) Assignee: MVG Industries, Villejust (FR)

( * ) Notice: Subject to any disclaimer, the term of this patent is extended or adjusted under 35 U.S.C. 154(b) by 192 days.

(21) Appl. No.: 18/850,157

(22) PCT Filed: Mar. 20, 2023

(86) PCT No.: PCT/FR2023/050385
§ 371 (c)(1),
(2) Date: Sep. 24, 2024

(87) PCT Pub. No.: WO2023/180659
PCT Pub. Date: Sep. 28, 2023

(65) Prior Publication Data

US 2026/0012817 A1 Jan. 8, 2026

(30) Foreign Application Priority Data

Mar. 25, 2022 (FR) ...................................... 2202690

(51) Int. Cl.
*H04W 24/06* (2009.01)
*H04B 17/10* (2015.01)

(52) U.S. Cl.
CPC ............ *H04W 24/06* (2013.01); *H04B 17/10* (2015.01)

(58) Field of Classification Search
CPC ..... H04W 24/06; H04W 24/00; H04W 24/02; H04B 17/10; H04B 17/15; H04B 17/16; H04B 17/191; H04B 17/00
See application file for complete search history.

(56) References Cited

U.S. PATENT DOCUMENTS 9,188,618 B2 11/2015 Gross
2013/0099985 A1 4/2013 Gross
(Continued)

FOREIGN PATENT DOCUMENTS

CN 204103928 U 1/2015
WO 2011138190 A1 11/2011
(Continued)

OTHER PUBLICATIONS

French Preliminary Search Report for Application No. FR 2202690 dated Oct. 21, 2022, 3 pages. [see pp. 1-2, categorizing the cited references.].
(Continued)

*Primary Examiner* — Keith Ferguson
(74) *Attorney, Agent, or Firm* — Lerner David LLP

(57) ABSTRACT

The invention relates to a system (1,1',1") comprising at least two transmission/reception modules that are intended to be connected to an antenna probe or a device under test, the module (4) comprising a transmission/reception submodule (411) connected to a processing and communication submodule (412), the transmission/reception submodule (411) comprising two radiofrequency outputs from which extend two radiofrequency cables (43) for connecting the module (4) to a radiating element or directly to a device under test, the processing and communication submodule (412) being configured, based on at least one communication protocol, to generate communication signals intended to be communicated to the transmission/reception submodule (411) so as to be transmitted on the radiofrequency cables (43), and the transmission/reception submodule (411) and the processing and communication submodule (412) being housed in a housing (42).

8 Claims, 5 Drawing Sheets

(56) References Cited

U.S. PATENT DOCUMENTS

| | | | | |
|---|---|---|---|---|
| 2014/0140225 | A1 | 5/2014 | Wala | |
| 2014/0273873 | A1* | 9/2014 | Huynh | H04B 17/294 455/67.12 |
| 2015/0078196 | A1 | 3/2015 | Olgaard | |
| 2021/0036419 | A1 | 2/2021 | Shamblin | |
| 2022/0216926 | A1 | 7/2022 | Hao et al. | |
| 2023/0254714 | A1 | 8/2023 | Murayama et al. | |

FOREIGN PATENT DOCUMENTS

| | | | |
|---|---|---|---|
| WO | 2018164627 | A1 | 9/2018 |
| WO | 2020074772 | A1 | 4/2020 |
| WO | 2021057772 | A1 | 4/2021 |
| WO | 2021255836 | A1 | 12/2021 |

OTHER PUBLICATIONS

International Search Report for Application No. PCT/FR2023/050385 mailed Jun. 6, 2023, pp. 1-4.

* cited by examiner

INTEGRATED AND COMPACT SMART TRANSMISSION AND RECEPTION SYSTEM

CROSS-REFERENCE TO RELATED APPLICATIONS

The present application is a national phase entry under 35 U.S.C § 371 of International Application No. PCT/FR2023/050385 filed Mar. 20, 2023, which claims priority from French Application No. 2202690 filed Mar. 25, 2022 all of which are hereby incorporated herein by reference.

TECHNICAL FIELD

The disclosure relates to a smart transceiver system synchronized at any location in space, making it possible in particular to network several radiating probes (or antennas) for the emission and/or reception of electromagnetic radiation as part of a beam formation or of a radiating device characterization.

The disclosure also relates to the characterization of a device under test. In this case, the transceiver can be alone for a characterization of a wired device, or connected to radiating probes and networked by optical link to generate a realistic wireless communication scenario to or from a communicating device under test.

STATE OF THE ART

A multi-sensor emission/reception system for characterizing a radiating device usually comprises several radiating electromagnetic probes (or antennas) disposed in the shape of an arch. This arrangement is advantageous in that it makes it possible to replace a mechanical displacement axis with an electronic scanning axis. Documents WO2012/45877 or WO2012/45879 describe such systems.

Such systems are advantageous compared to a conventional measurement means of the CAMB (Compact Antenna Measurement Base) type or of the single sensor type. These systems constitute a very powerful and rapid measurement means.

However, with the conventional single or multi-sensor systems, the probes are passive and permanently wired for an operating configuration fixed at installation. Furthermore, it is difficult to position them anywhere in space given the difficulties inherent in the wiring.

DISCLOSURE OF THE DISCLOSURE

The disclosure solves the problem of reconfiguring the emission/reception systems for the measurement or the formation of beams in order to obtain great flexibility of use.

To this end, the disclosure relates to an emission/reception system comprising at least two modules intended to be connected to an antenna probe or a device under test, each comprising an emission/reception sub-module connected to a processing and communication sub-module, the emission/reception sub-module comprising two radio frequency outputs from which two radio frequency cables extend to connect the module to a radiating element or directly to a device under test, the processing and communication sub-module being configured to generate from at least one communication protocol communication signals intended to be communicated to the emission/reception sub-module to be transmitted on the radio frequency cables, the emission/reception sub-module, the processing and communication sub-module are housed in a casing preferably shielded to be impervious to electromagnetic radiation, the modules being in addition connected together in series by means of an optical link.

The disclosure is advantageously supplemented by the following characteristics, taken alone or in any of their technically possible combinations:

- each module is associated with a bipolarized antenna connected to the emission/reception sub-module via radio frequency cables;
- the radio frequency cables have the shortest possible length allowing the connection of the elements with radio frequency connections while limiting the associated losses.
- the emission/reception system comprises a control unit configured to communicate a communication protocol to the module, the control unit being connected to the module via a dedicated link adapted to the signals, the link being an Ethernet link or an optical link.
- the modules are connected together in series by means of an optical link, the system comprising a control unit connected to the first module of the series of modules via a dedicated link and configured to control the modules and to synchronize them together, the control unit being able to control one or several chains of modules.
- the control unit is configured to control the modules and to synchronize them together so as to generate an electromagnetic environment.
- the modules are disposed on a support in the form of an arch, disk or sphere, the support being intended to be positioned around a device under test;
- the control unit is configured to configure each module as a function of a defined measurement environment.

The disclosure therefore proposes a reconfigurable system making it possible to completely reconfigure the emission/reception system on demand.

The disclosure makes it possible to generate a scenario dedicated to any location in space.

In the case of several networked systems, the different systems are distributed in space by being synchronized with each other at dedicated positions. It is therefore possible to exactly control their behavior in time and space.

Each system is advantageously small and therefore compact, which allows it to be disposed anywhere in space. Also, the dimensions lead to a technological concentration allowing a distribution of a large number of the systems.

For low-frequency applications, the disclosure makes it possible to create measurement systems that are compact and easy to control and calibrate. For example, it is possible to generate a plane wave at short distance with a wall of emission/reception systems.

The synchronization of the different systems allows having parallelized processing operations, which allows an increase in speed. Thus, specific processing operations can be carried out remotely or distributed across all the different systems.

Each system can communicate directly with a computer via USB/Ethernet links.

In addition to the ability to perform measurements in OTA (Over The Air) communication, that is to say any type of wireless communication, the disclosure can also be used as a measuring instrument of the vector network analyzer, spectrum analyzer, vector signal analyzer type.

The modular aspect of the architecture of the system makes it possible to cascade blocks in order to add functionalities such as the frequency conversion to higher or lower frequencies, the RCS (Radar Cross Section) or S parameters (Scattering Parameters) measurements.

The system according to the disclosure is intended to equip for example the multi-sensor radiofrequency measurement systems (in particular the spherical near-field measurement bases).

The system according to the disclosure can be used to generate radiation diagrams that can be reconfigured at will in reception as well as in emission, in particular for the plane wave synthesis or the beam formation, by networking them.

The targeted frequency range of the radio frequency spectrum extends from a few megahertz to a few hundred gigahertz.

Particularly, the disclosure makes it possible to test and therefore characterize communicating devices with 5G frequencies. The disclosure makes it possible to test one or several antennas powered by means of cables or provided directly with their source or with their integrated receivers and which can operate in emission and/or reception.

The disclosure makes it possible to know the response of the antenna and of the integrated transceiver of a mobile phone to external electromagnetic radiation.

The disclosure makes it possible to know the response of a GNSS (Global Navigation Satellite System) antenna with its on-board receiver to external electromagnetic interference.

The disclosure makes it possible to measure the radiation pattern of a radar antenna in several directions in space.

The disclosure makes it possible to measure the sensitivity of a mobile phone in several directions of space and also to generate wave propagation scenarios corresponding to an environment such as a building, a vehicle, and/or an urban or rural area.

Being able to synchronize all the systems allows testing devices operating at high frequencies. Indeed, in 5G technology, several hundred MHz (for example 200 MHz) of bandwidth must be passed in each 5G MIMO channel. This means the possibility of analyzing 200 million pieces of information in one second. To do so, all the systems must be synchronized with each other. Such performances are not possible with the current systems that rarely reach the 200 MHz bandwidth and these are moreover systems of large dimensions.

Generally, any communicating system can be characterized and put into a communication situation in a realistic scenario by means of the disclosure including integrated instrumentation. A whole battery of tests can thus be carried out thanks to the reconfigurable nature of the system of the disclosure at will.

PRESENTATION OF THE FIGURES

Other characteristics, aims and advantages of the disclosure will emerge from the following description, which is purely illustrative and not limiting, and which should be read in relation to the appended drawings in which.

Figure 3:
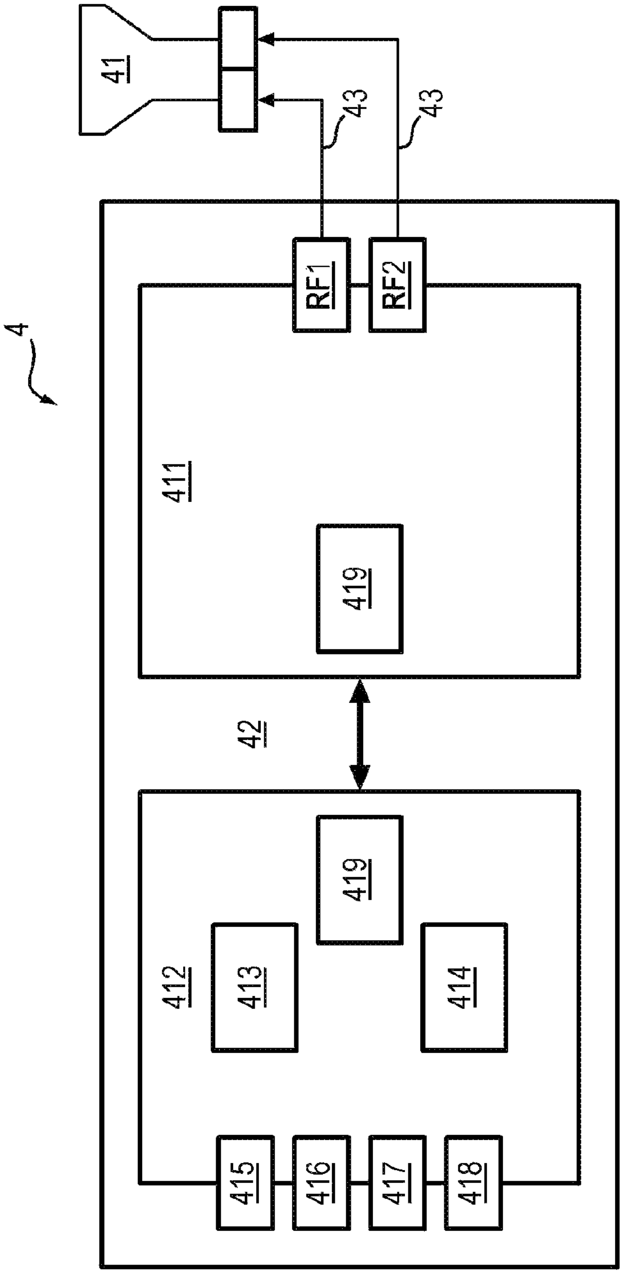
Figure 4:
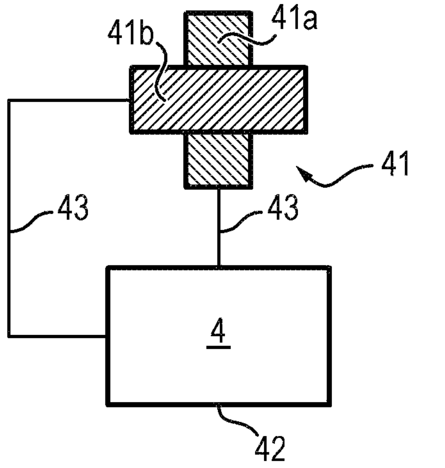
Figure 5:
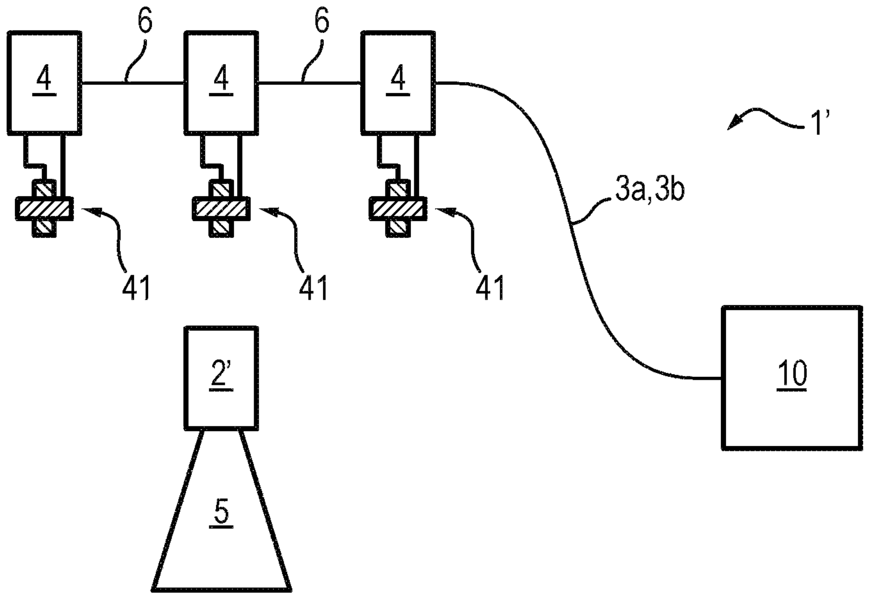
Figure 6:
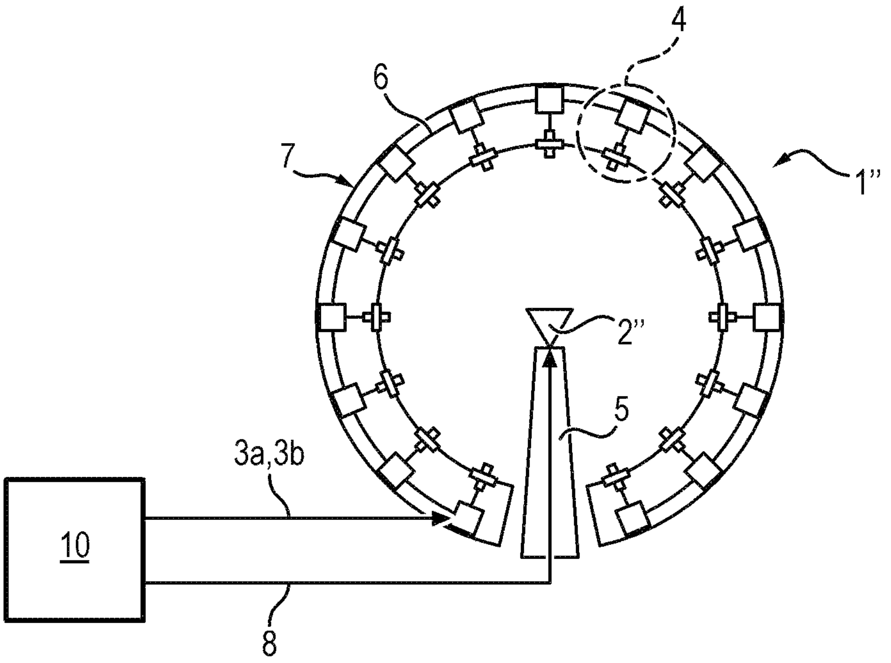
Figure 7:
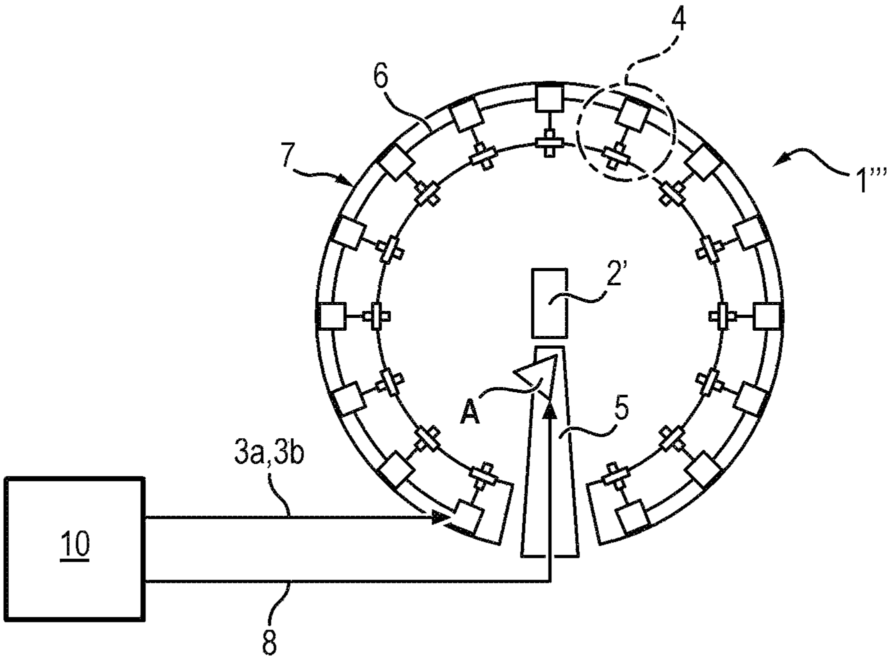
Figure 8A:
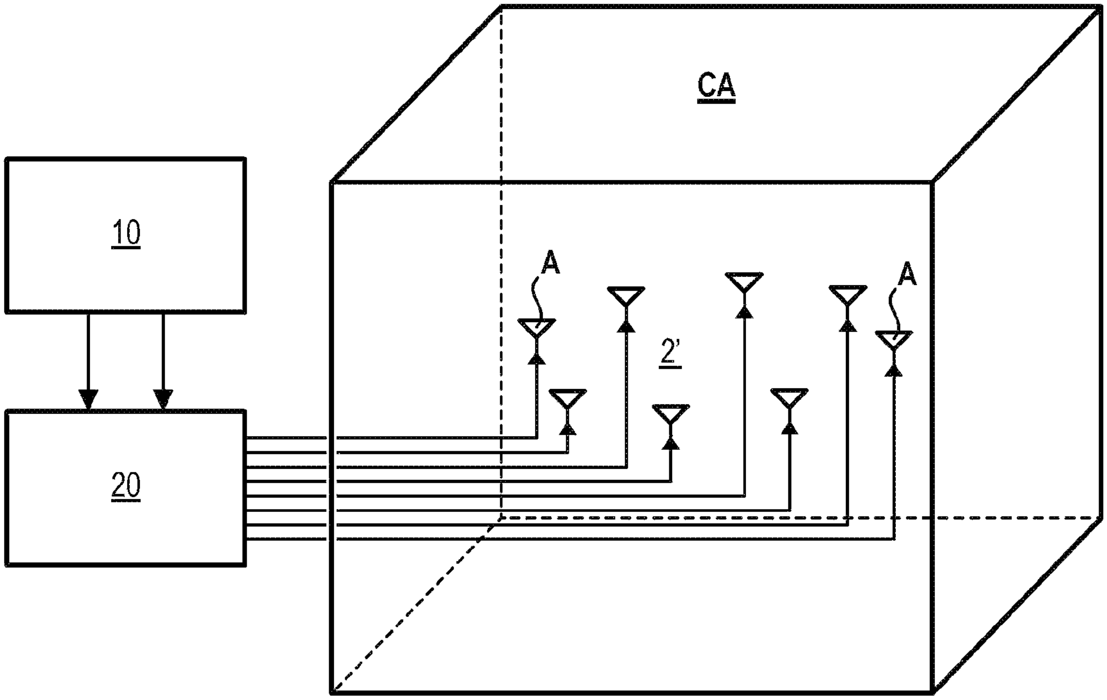
Figure 8B:
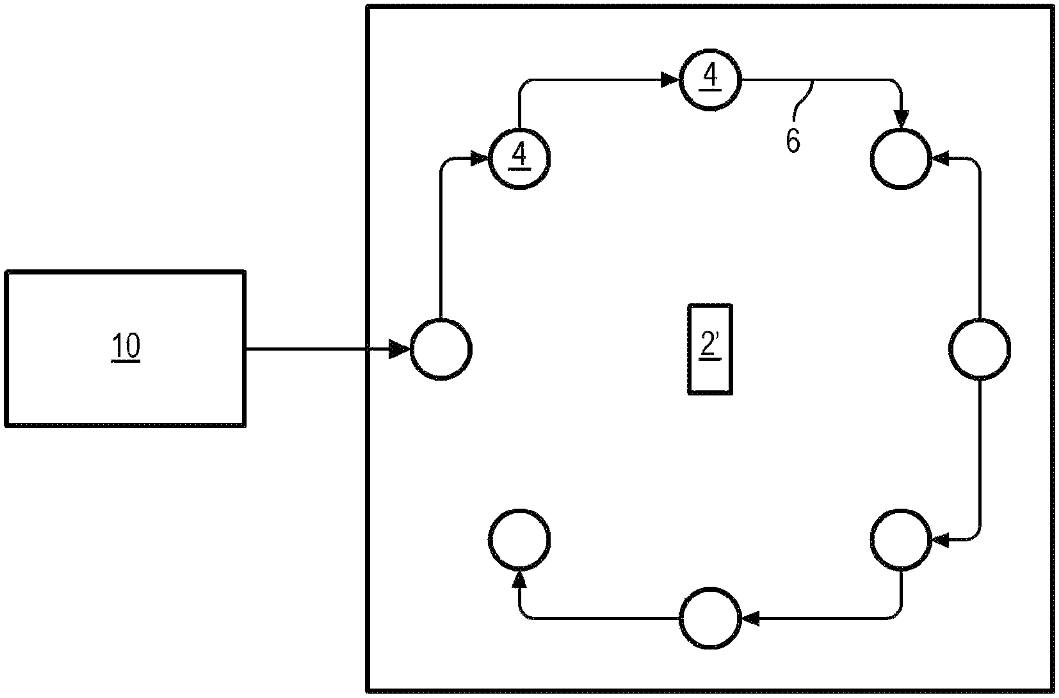

FIG. 3 schematically illustrates a module of an emission/reception system;

FIG. 4 illustrates an antenna of a probe;

FIG. 5 illustrates an emission/reception system according to a third embodiment;

FIG. 6 illustrates an emission/reception system according to a fourth embodiment;

FIG. 7 illustrates an emission/reception system according to a fifth embodiment;

FIGS. 8*a* and 8*b* schematically illustrate the measurement of a communicating device in a classic MIMO system whose wired configuration is fixed, compared to a MIMO system obtained by means of the system according to the disclosure.

DETAILED DESCRIPTION

General Principle

Figure 1:
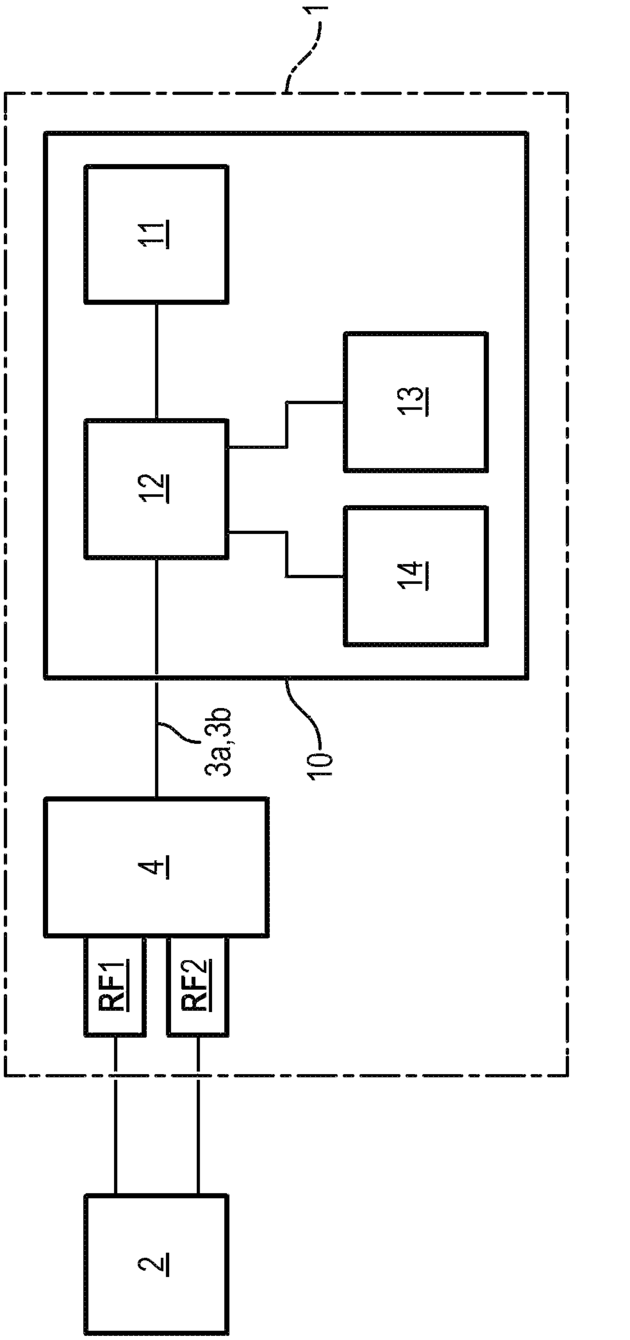
FIG. 1 illustrates an emission/reception system according to a first embodiment.

FIG. 1 illustrates an emission/reception system 1 intended to be in communication with a device 2, for example a device under test (DUT) according to a first embodiment. According to this first embodiment, the system 1 comprises an emission/reception module 4 directly connected to the device 2.

Figure 2:
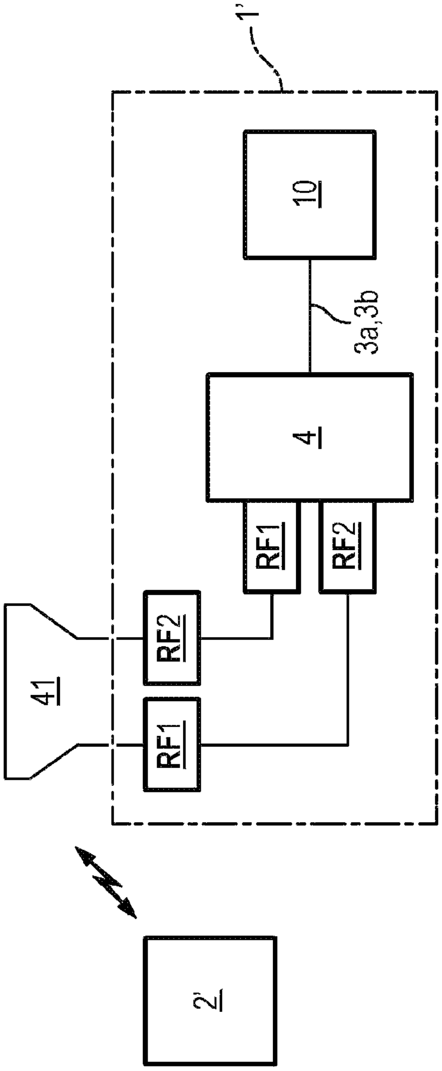
FIG. 2 illustrates an emission/reception system according to a second embodiment.

FIG. 2 illustrates an emission/reception system 1' intended to be in communication with a device 2' according to a second embodiment. According to this second embodiment, the system 1' comprises a module 4 connected to the device 2' by a wireless link via an antenna 41 or probe. This may also be a device under test 2'.

As illustrated in FIG. 3, the module 4 comprises an emission/reception sub-module 411 connected to a processing and communication sub-module 412, the emission/reception sub-module 411 comprising two radio frequency outputs RF1, RF2 from which two radio frequency cables 43 extend to connect the module 4 directly to a device 2 or to an antenna 41.

The emission/reception sub-module 411 and the processing and communication sub-module 412 are advantageously housed in a casing 42 preferably shielded to be impervious to electromagnetic radiation. The casing 42 is small, as small as possible to properly house the different elements.

The processing and communication sub-module 412 is configured to generate, from at least one communication protocol, communication signals intended to be communicated to the emission/reception sub-module 411 in order to be transmitted on the radio frequency cables 43. A communication protocol is typically one among 5G, 4G, Wi-Fi, Bluetooth™ communication protocols or more generally a specification of several rules for a particular type of communication.

The radio frequency cables 43 are of the shortest possible length. They generally do not exceed, for example, 10 cm. But the length of the radiofrequency cables 43 can be adapted according to the frequency or integration constraint. The advantage is to be able to position the module 4 as close as possible to the device 2 to which it must connect, or if connected to an antenna 41, to limit the losses due to its wiring.

The processing and communication sub-module 412 comprises a stage 413 for the processing of the signals and a stage 414 for the management of the communication. The processing stage 413 comprises for example a processor and one or several FPGAs (Field-Programmable Gate Array) and makes it possible to process and calibrate the signals on the one hand, but also to configure the shape of the electromagnetic wave (attenuation, phase shift, fading, Doppler effect, or time delay effect). It is thus possible to generate chirps for radar applications for example. It is also possible to generate complex modulated signals (e.g. 2G, 3G, 4G, 5G, Wi-Fi, radar signals etc.).

Among the possible signal processing operations made by the module 412, there is the adjustment of the gain, of the phase, the filtering, the time shifting, the addition of random noise, the simulation of the Doppler effect, etc.

The communication stage 413 is configured for the management of the communication and is in connection with different interfaces: USB 415, optical 416, Ethernet 417 interface depending on the desired communication. The USB interface makes it possible to connect the module 4 to a measurement system 12 or directly to a computer for the programming of the FPGA and for its debugging, the optical interface 416 to an optical link and the Ethernet interface to a control unit 11 of the computer type for example. The optical interface 416 allows in particular the communication between two modules.

Furthermore, the sub-module 412 comprises an interface 418 for the power supply of the sub-modules 411, 412.

The sub-module 411 comprises an interface 419 to be connected to the sub-module 412. According to this example, the sub-modules 411, 412 are on separate electronic maps for better integration into the system, but these sub-modules can very well be integrated on a single map.

Each module 4 therefore comprises a digital transceiver comprising several channels (for example two channels) and a directly implemented channel emulator function making it possible to generate advanced communication protocols. The module 4 is reversible in the sense that it can emit a signal (Tx direction), as well as receive one (Rx direction). In reception (Rx), the module 4 can measure a signal and carry out processing operations on this signal. In emission (Tx), the module generates the desired signal.

As a result, each module 4 can be reconfigured as desired, which allows great flexibility in its use.

Also, the consumption of the system is relatively low compared to conventional equipment equipping a multi-sensor system with conventional architecture including passive modules. There is therefore a power gain in the link budget that allows working with signals at lower levels and correspondingly reduced energy consumption.

The consumption varies depending on the chosen application which requires more or less computing power. The system of the disclosure allows flexible consumption depending on the type of use. Given the simple wiring, the possible applications are multiple. Each module is capable of receiving and transmitting a CW or complex signal.

Furthermore, given that the emission/reception sub-module 411 is as close as possible to the antenna, all radio processing operations and in particular the baseband passage takes place at this location and the wired radio frequency link usually a source of loss is no longer a constraint here.

Also, the processing operations being carried out at the level of each module, it becomes perfect thanks to the calibration applied locally. Furthermore, when the modules are calibrated, the calibration data can be stored at the level of the processing and communication sub-module and not on an external device as is the case with conventional systems.

The low use of wired radio frequency links allows using the system to measure test devices 2 of large dimensions: aircraft, satellite or automobile.

The communication protocol is provided to the module (particularly in the stage 413) via a control unit 10. The control unit 10 may, depending on the case, only comprise a computer 11 which sends the protocol to the module by a dedicated Ethernet type link 3*a*. However, to allow sending to the module 4 signals that are not supported by an Ethernet link (bandwidth, flow rates), the control unit 10 comprises, in addition to the computer 11, a casing 12 making it possible to generate signals that are not supported by an Ethernet link. The casing 12 is in connection with the computer 11 that drives it. Such a casing is a CPRI (Common Public Radio Interface) casing. The module 4 is in this case connected to the casing 12 via an optical link 3*b*. Also, the control unit 10 can also comprise a spectrum analyzer 14 connected to the computer 11.

In the latter case, the casing 12 is advantageously connected to a radio measurement system 13 (Radio Communication Tester, RCT). Thus, the casing 12 has the role of also interfacing with the conventional measurement apparatuses (network emulator, complex signal generator, etc.).

The computer 11 therefore makes it possible to manage the parameterization of the module 4 remotely and it is more generally a device comprising a user interface, a processor and an Ethernet link. The computer 11 also makes it possible to identify a malfunction of the module 4. As will be understood, all the intelligence of the module is positioned as close as possible to the device under test 2.

According to the second embodiment, illustrated in FIG. 2, the module 4 is connected to a device under test 2' via an antenna 41 which is a bipolarized passive antenna 41, the device under test 2' then being a radiating device, a mobile phone, a tablet, a connected object. As illustrated in FIG. 4, the passive antenna 41 is advantageously an assembly of two radiating elements 41*a*, 41*b* in a cross-shaped assembly, each element of the cross corresponding to a polarization for the radiation of the antenna 41. The passive antenna 41 has dimensions that depend on the desired frequencies in relation to the device under test 2'. The advantage of the orthogonal positioning of two linearly polarized antennas is to perfectly know the wave vector in the plane of the antennas, and therefore to know the electric field specifically at this location.

The dimensions depend on the frequency bands covered by the antenna. For example: 0.4-6 GHZ, 6-18 GHZ, 18-50 GHz. The higher the frequency band the smaller the dimensions. The lower the frequency band the larger the dimensions.

The passive antenna 41 is in connection with the emission/reception sub-module 411 via two radio frequency links 43 (one for each polarization and therefore each radiating element 41*a*, 41*b* of the antenna 41). These radio frequency links must be as short as possible. Particularly, the passive antenna 41 is at a distance by approximately a few centimeters from the casing 42. It will be noted here that this distance is very small and that it is sought to have the shortest possible wired link to overcome as much as possible losses of the wired links inherent to the high frequencies. In the case illustrated here, the losses are limited.

Indeed, the losses (i.e. which cause attenuation of the signal) of the cables increase significantly with the frequency and become prohibitive beyond approximately 20 GHz. A wired link is therefore acceptable over a few centimeters, but not over several meters. Thus, the use of amplifiers is here avoided to compensate for the losses of the signal and the overall budget in terms of energy consumption and noise factor is therefore better than with systems where the electronics and intelligence are far away behind the radio frequency cables.

Thus, as indicated, the module 4 comprises an emission/reception sub-module 411 connected to a processing and communication sub-module 412, the emission/reception sub-module 411 comprising two radio frequency outputs RF1, RF2 from which two radio frequency cables 43 extend to connect the module 4 to a radiating element 41 or directly to the device under test 2.

Case of Several Probes Positioned in Space

FIG. 5 illustrates an emission/reception system 1' according to a third embodiment comprising several modules 4, here three modules 4 identical to the one already described. A device under test 2' is here positioned on a support 5. Such a support 5 is movable about an axis of rotation so as to be able to position the device under test 2 in different ways depending on the desired measurements. It is specified that it is possible to use a matrix of modules distributed in a plane. In this case, the emission/reception system is used to form beams and not to test a device under test. Several modules with radiating antennas can be disposed on the same 2D plane to constitute a network (rectangular in shape, or round in general) and in this case it is possible to form a particular beam pointing one or several directions of space to emit or receive the signals (Tx/Rx).

The modules 4 are small sized and can be positioned anywhere in space and particularly around the device under test.

The modules 4 are connected to each other in series by a high-speed link 6, preferably an optical link. Particularly, each module 4 is connected in series to its neighbor by the optical link 6 (Daisy Chain) and the link can be in both directions, that is to say a module can communicate with its neighbors in both directions.

The modules 4 are powered by means of a power cable in connection with a power supply (not represented). The power cable connects each module two by two in the same way as the optical link 6.

Thus, the measurement system 1' essentially comprises an optical link 6 and an power supply cable.

The link between two modules 4 is configured to convey digital data for this two-by-two communication. In addition, the wiring of the modules 4 is simple and allows a significant data rate on the optical link.

In order to operate all the modules, the system 1' here again comprises a control unit 10 configured to control the modules 4 around or in the vicinity of the device under test 2' and to synchronize them with each other. Particularly, the control unit 10 communicates with all the other modules 4 via the first module of the series of modules 4 by being connected to this module by a dedicated link 3*a*, 3*b* (Ethernet or optical link depending on the type of signals). Here again, the radio frequency links are almost non-existent. The control unit 10 conforms to the one described in relation to FIG. 1.

Thanks to the link 3*a*, 3*b* between the control unit 10 and the first module of the series of modules 4, the control unit 10 makes it possible to synchronize all of the other modules and is capable of identifying what each module 4 does at every moment.

This is important as the measurements and the environment desired for the test require real-time control. Thus, great flexibility of use is obtained since each module can be parameterized and reconfigured remotely via the control unit 10. Particularly, it is possible to send identical data (for example in baseband) to all the modules 4 and to have particular processing operations for each module 4. These processing operations contribute to generating a particular electromagnetic environment (through the adjustment of the gain, of the phase, the filtering, the time shifting, the addition of random noise, the simulation of the Doppler effect, etc.). Also, it is possible to generate different "propagation scenarios", or "modeling of the propagation channel". The aim is to implement real use scenarios in a controlled environment. For example a phone use scenario in an office, or in a car, or on a train, etc.

The control unit 10 also makes it possible to identify a malfunction in one of the modules by self-diagnosis.

The processing and communication sub-module 412 supports the CPRI (Common Public Radio Interface) communication protocol which allows a module 4 to communicate with its neighbors.

Given the modules can be reconfigured at will, each module 4 offers the possibility of on-board processing operations, including in particular the correction of the errors related to the antennal imperfection of the modules (orthomodes). The on-board processing operations between pairs of modules 4 (or multiplets of probes) to carry out measurements of transmission parameters are also possible.

As already mentioned, advantageously, it is seen that the only existing radio frequency links are those that connect the sub-module 411 to the antenna 41 made up of transducer radiating elements. These links are very short and the associated losses are therefore very low, which no longer constitutes a barrier for use at the highest frequencies of the 5G spectrum. Furthermore, the low presence of the radio frequency links solves the problem of crucial link losses at high frequencies (order of magnitude >20 GHz).

Case of Several Modules Positioned on an Arch

FIG. 6 illustrates an emission/reception system 1" according to a fourth embodiment for measuring the electromagnetic radiation of a radiating device 2".

The device under test 2" is advantageously positioned on a support 5.

The modules 4 are distributed over a support structure 7 which in FIG. 6 is in the shape of an arch but other shapes are possible. A distribution according to a matrix or spherical structure is, for example, possible. The shape of the support 7 depends on the desired measurement context.

The advantage of disposing them on an arch makes it possible to reconstitute, by rotation of the axis of the support 5, the 3D map of the electromagnetic radiation of the device under test 2". Typically, the distribution of the modules and therefore of the antennas on the arch is regular for the 3D characterization (the device under test can be passive). Only in the case of particular communications scenarios only some modules are activated, and in this case the device under, test is necessarily an active (or autonomous Tx/Rx) communicating device. These modules can be positioned on a sphere (for example fifteen modules distributed in a discrete manner), and are in this case positioned in space (with synchronization and freedom of the positioning without constraints related to the losses of links) as presented in FIG. 5.

The support 5 is movable and makes it possible to make successive vertical sections of radiation so as to cover the entire sphere surrounding the device under test 2" and thus obtain complete 3D radiation.

According to this fourth embodiment, the radiating device under test 2" is an antenna to be characterized in emission and in reception.

The device under test 2" is connected to the control unit via a radio frequency wired link 8 while the series of modules 4 is connected to the controller 10 via an optical or Ethernet link depending on the signals used to characterize the antenna. Advantageously, this would be an optical link for testing 5G antennas in particular. In any case, as already discussed, the modules 4 are connected to each other via an optical link 6 (see also FIG. 5 and the associated description).

FIG. 7 illustrates an emission/reception system 1" according to a fifth embodiment for the measurement of the electromagnetic radiation of a radiating device 2'.

Here again such a device under test 2' is positioned on a support 5 and is here a communicating device such as a mobile phone. In this case, the system comprises a relay antenna A to simulate communication with a base station in the downlink direction and the modules 4 are used to capture the waves emitted by the device under test 2' in the uplink direction. The roles are reversed in the direction of communication. The use of this relay antenna A is a possibility when it comes to testing a communicating object, because full duplex communication is also possible with the modules 4. The relay antenna A is connected to the controller 10 via a wired radiofrequency link 8.

In the case of use of a support as illustrated in FIGS. 6 and 7, the casing 42 is housed in the support structure 7 around the device under test 2'. This is different from known multi-sensor solutions according to which each antenna is connected to a bay by radio frequency links which are necessarily greater than in the solution described here, the bay not being able to be positioned as close as possible to the modules 4.

The disclosure is also advantageously used for MIMO (Multiple Input Multiple Output) OTA (Over The Air) simulation which usually uses a centralized channel emulator. Here, thanks to the disclosure, such simulation is facilitated thanks to the architecture of the system of the disclosure: more flexibility and easy wiring, decentralized computing power, scalable architecture.

In FIG. 8*a*, the device under test 2' (a mobile phone) is placed in an anechoic chamber CA around antennas A connected to a bay 20 and a control unit 10. The antennas A and the bay 20 make it possible to simulate a MIMO environment. It is seen in this figure the complex wiring of each antenna A. in contrast, in FIG. 8*b*, the device under test 2' is placed in the center of the modules 4 of the system according to the disclosure with simplified wiring by means in particular of an optical link 6 to the control unit 10. The advantage of the module according to the disclosure is seen in these two examples.

As part of the plane wave generation from the system according to the disclosure, it is possible to migrate to each probe all the baseband I&Q data processing.

According to the requirements of 5G, the system of the disclosure makes it possible to test radiating or communicating RF equipment over a wide range of frequencies (up to tens of gigahertz), with a wide bandwidth of several hundred MHz, and to simulate numerous test conditions such as multipath, Doppler effect, noise.

The invention claimed is:

1. An emission/reception system comprising:

at least two emission/reception modules intended to be connected to an antenna probe or a device under test;

wherein each module comprises an emission/reception sub-module, a processing and communication sub-module, connected to the emission/reception sub-module, and a casing shielded to be impervious to electromagnetic radiation, the processing and communication sub-module being housed in the casing shielded; and wherein the emission/reception sub-module comprises two radio frequency outputs from which two radio frequency cables extend to connect the module to the antenna probe or the device under test, and wherein the processing and communication sub-module is configured to generate, from communication protocol, communication signals intended to be communicated to the emission/reception sub-module to be transmitted on the radio frequency cables; and wherein the emission/reception modules are connected together in series by an optical link.

2. The emission/reception system according to claim 1, wherein each emission/reception module is associated with a bipolarized antenna connected to the emission/reception sub-module via the radio frequency cables.

3. The emission/reception system according to claim 1, wherein the radio frequency cables have a length of less than 10 cm.

4. The emission/reception system according to claim 1, further comprising a control unit configured to communicate the communication protocol to the emission/reception module, the control unit being connected to the emission/reception module via a dedicated link adapted to the communication protocol, the link being an Ethernet link or an optical link.

5. The emission/reception system according to claim 1, comprising a control unit, wherein the emission/reception modules are connected in series to the control unit via a dedicated link and wherein the control unit is configured to control and to synchronize together the emission/reception modules, the control unit being able to control one or several emission/reception modules.

6. The emission/reception system according to claim 5, wherein the control unit is configured to control and to synchronize together the emission/reception modules so as to generate an electromagnetic environment.

7. The emission/reception system according to claim 6, wherein the modules are disposed on a support in the form of an arch, disk or sphere, the support being intended to be positioned around the device under test.

8. The emission/reception system according to claim 6, wherein the control unit is configured to configure each of the emission/reception modules as a function of a defined measurement environment.

* * * * *